United States Patent [19]

Rowe et al.

[11] Patent Number: 5,734,220

[45] Date of Patent: Mar. 31, 1998

[54] PRELOADING SYSTEM FOR A CLAMP OF A STATOR END WINDING COIL

[75] Inventors: Charles M. Rowe; Lorenzo E. Ramirez Coronel, both of Orlando, Fla.

[73] Assignee: Westinghouse Electric Corporation, Pittsburgh, Pa.

[21] Appl. No.: 745,905

[22] Filed: Nov. 7, 1996

[51] Int. Cl.⁶ .................................................. H02K 3/46
[52] U.S. Cl. ........................................................ 310/260
[58] Field of Search ................................. 310/260, 270, 310/42

[56] References Cited

U.S. PATENT DOCUMENTS

| | | | |
|---|---|---|---|
| 3,691,416 | 9/1972 | Drexler et al. | 310/260 |
| 3,866,073 | 2/1975 | Gjaja | 310/260 |
| 3,949,257 | 4/1976 | Cooper et al. | 310/260 |
| 3,974,409 | 8/1976 | Loy | 310/260 |
| 3,988,625 | 10/1976 | Jäger et al. | 310/260 |
| 3,991,334 | 11/1976 | Cooper et al. | 310/260 |
| 4,016,443 | 4/1977 | Johnson | 310/260 |
| 4,088,913 | 5/1978 | Prigorovsky et al. | 310/260 |
| 4,488,079 | 12/1984 | Dailey et al. | 310/260 |
| 4,563,607 | 1/1986 | Cooper et al. | 310/260 |
| 4,618,795 | 10/1986 | Cooper et al. | 310/260 |
| 4,782,579 | 11/1988 | Rowe et al. | 29/596 |
| 4,950,934 | 8/1990 | Holly, III | 310/260 |
| 5,373,211 | 12/1994 | Ramirez-Colonel et al. | 310/260 |

Primary Examiner—Clayton E. LaBalle

[57] ABSTRACT

A preload system for preloading end winding coils of a stator includes a coil support platform coupled to a periphery of one of the coils, a clamping apparatus compressing the end winding coils and the coil support platform and a preload apparatus between the clamping apparatus and the coil support platform and not running circumferentially around the clamping apparatus.

18 Claims, 1 Drawing Sheet

PRELOADING SYSTEM FOR A CLAMP OF A STATOR END WINDING COIL

BACKGROUND OF THE INVENTION

An improved preloading system for preloading a clamp of a stator end winding coil of a dynamoelectric machine.

As disclosed in U.S. Pat. No. 4,563,607 titled Radial Band Assembly for Dynamoelectric Machine Stator Coil End Turns, end winding coils of a stator of a dynamoelectric machine are typically clamped under pressure by a radial band clamp. By placing these end winding coils under pressure, the vibration of the end winding coils is minimized. By minimizing the vibration, the probability of fatigue failure is reduced and insulation wear is minimized.

Although the coils are initially clamped under pressure, during operations of a dynamoelectric machine creep in the insulation system of the clamped components occurs. As will be appreciated by those skilled in the art, as creep occurs in the insulation system, the pressure exerted by the radial band decreases. As the pressure exerted decreases, the vibration of the end winding coils increases, which may result in excessive insulation wear and increase the chance of fatigue failure. To prevent this from happening, as disclosed in the reference cited above, the radial band clamp is typically preloaded to prevent or minimize the rate of relaxation of the pressure exerted by the radial band clamp on the end winding coils. Additionally, the radial band of the radial band clamp is stretched under tension to provide pressure to combat the insulation creep. More particularly, if insulation creep occurs, the tensioned radial band will react to place a force on the coils.

The method of preloading disclosed in U.S. Pat. No. 4,563,607 includes running the radial band of the radial band clamp through an aperture in a support block and a spring. Unfortunately the spring often fails under pressure, making this method of preloading in this preload system less than adequate. More specifically, the highly pressurized radial band typically cuts into the spring, weakening the spring. As the spring weakens, it may fail and result in the preload pressure the spring provides being lost. If this occurs, as the end winding coils vibrate the pressure exerted by the radial band clamp will decrease at a faster rate and to a lower magnitude. With less pressure exerted on the end winding coils, the vibration of the end winding coils increases, which may cause fatigue cracking and insulation wear.

Thus, it is clear there has existed a long an unfulfilled need in the prior art for a preload system that maintains a preload on the end winding coils of a stator of a dynamo electric machine without failing due to the radial band weakening the spring.

SUMMARY OF THE INVENTION

Accordingly, it is an object of this invention to provide for a preload system that maintains a preload on the end winding coils of a stator of a dynamoelectric machine without failing due to the radial band weakening the spring.

In order to achieve the above and other objects of the invention, a preload system for preloading a first coil end winding and a second coil end winding of a stator includes a first coil support platform coupled to a periphery of the first coil; a clamping apparatus compressing the end winding coils and the first coil support platform and a first preload apparatus between the clamping apparatus and the first coil support platform and not running circumferentially around the clamping apparatus.

According to another aspect of this invention, the preload system further includes a clamping apparatus having a band and a first band pin, a first preload apparatus arranged between a first end of the first band pin and the first coil support platform and not running circumferentially around the band and a second preload apparatus between a second end of the first band pin and the first coil support platform and not running circumferentially around the band.

According to a third aspect of this invention, a preload system further includes a second coil support platform coupled to a periphery of the second coil, a filler layer between the first coil support platform and the first coil, the clamping apparatus compressing the second coil support platform and having a second band pin and the preload apparatuses not touching the radial band of the clamping apparatus.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENTS

Figure 1:
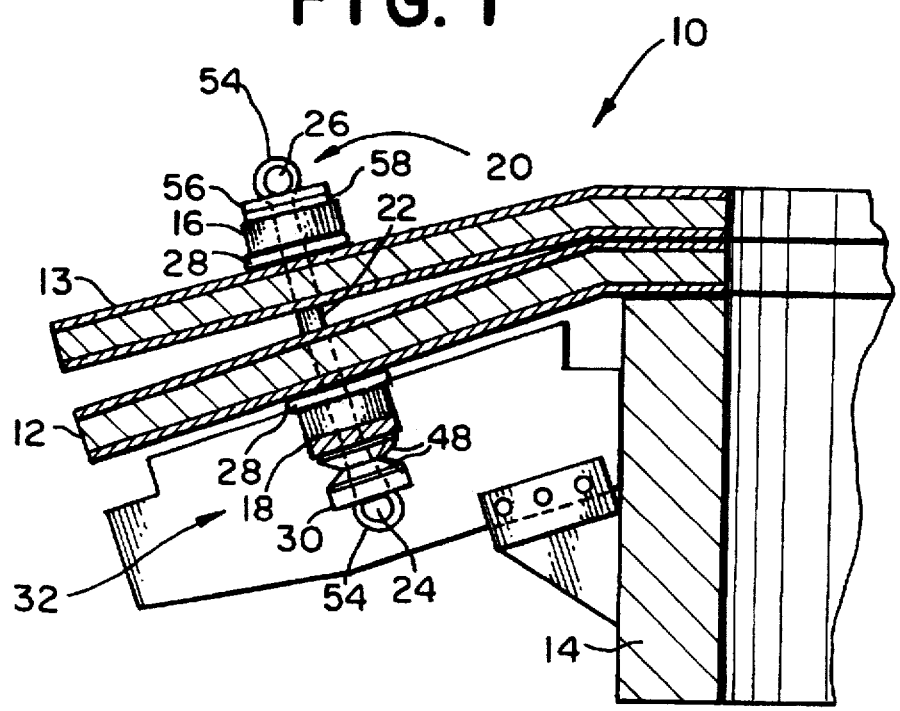
FIG. 1 is a fragmentary cross sectional view of the preload system according to a preferred embodiment of this invention.

Referring now to the drawings, wherein like reference numerals designate corresponding structure throughout the views, and referring in particular to FIGS. 1 and 2, a preload system 10 for preloading a first coil end winding 12 and a second coil end winding 13 of a stator 14 includes a first coil support platform 18 that is below the first coil 12, a clamping apparatus 20 for compressing the end winding coils 12, 13 and the first coil support platform 18, and a first preload apparatus 32 that is positioned between the clamping apparatus 20 and the first coil support platform 18. As may be seen in FIGS. 1 and 2, the preload apparatus 32 does not run circumferentially around the clamping apparatus 20, as did the preload systems discussed above with reference to conventional systems.

Figure 2:
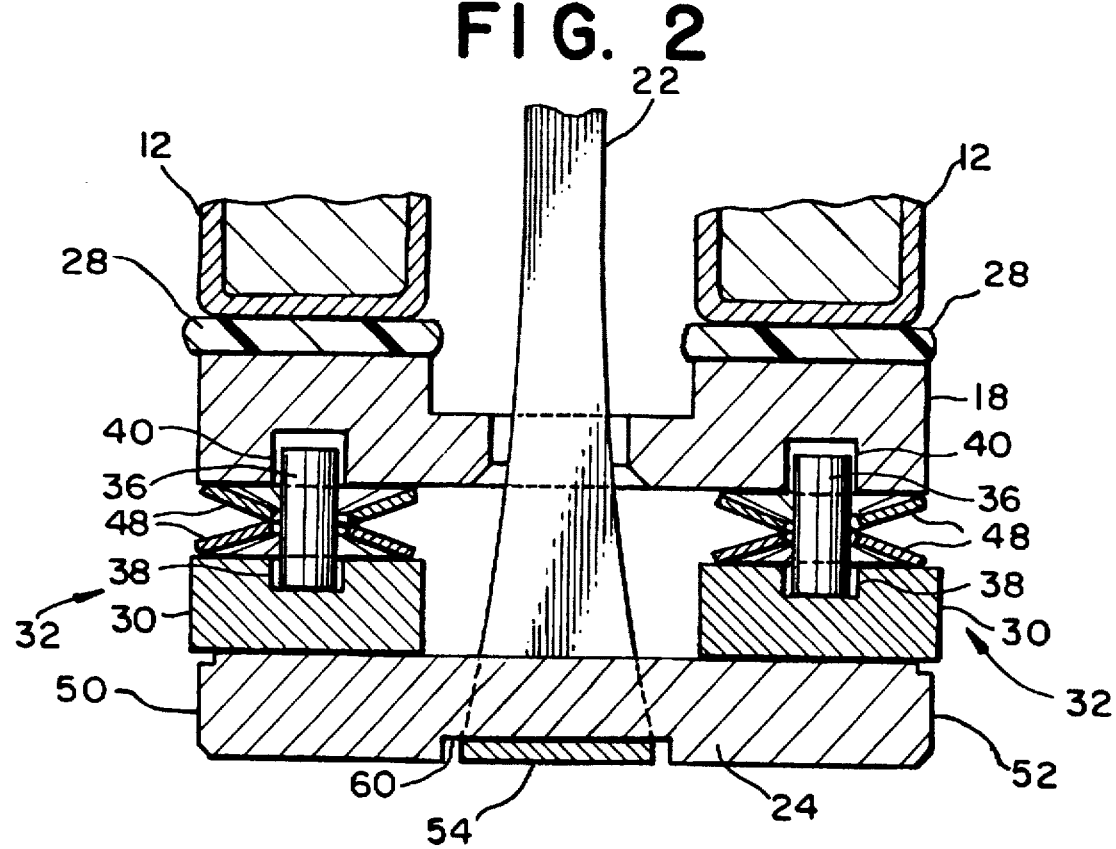
FIG. 2 is another fragmentary cross sectional view, taken along a different plane, of the preload system depicted in FIG. 1.

Also depicted in FIGS. 1 and 2 is the clamping apparatus 20. In the illustrated embodiment, the clamping apparatus 20 is a radial band clamp that compresses the end winding coils 12, 13. As is known in the art, the radial band clamp 20 is so named because it extends in essentially a radially direction in relation to the axis of the dynamo electric machine to which the coils 12,13 are attached. The radial band clamp 20 has a radial band 22, a first radial band pin 24 and a second radial band pin 26. As is shown in FIG. 1, the radial band 22 has an end loop 54 at each end with one of the radial band pins 24,26 extending through each of the end loops 54. Additionally, as depicted in FIG. 2, the first radial band pin 24 has a channel 60 through which an end loop 54 runs. Although not depicted in the drawings, the second radial band pin 26 has a similar channel. As is also shown in FIG. 1, the radial band pins 24, 26 are oriented transverse to the direction the coils 12, 13 run. In this embodiment, the first radial band pin 24 has a first end 50 and a second end 52.

As disclosed in U.S. Pat. No. 4,563,607, the radial band 22 is typically constructed of fiberglass impregnated with a polyester resin. Also discussed in this patent is a method of installing the radial band 22. Such a method may include placing the band 22 through the coils 12, 13, curing the band 22 with hot air, placing the band 22 under pressure by twisting the ends 54 of the band 22, curing the band 22 and then tensioning the band 22 with a hydraulic jack (not shown as it would be obvious to one skilled in the art).

In the preferred embodiment shown in FIG. 1, the system 10 also includes a second coil support platform 16 above the second coil 13. The coil support platforms 16, 18 are compressed under the compressing apparatus 20 and transmit the force exerted by the compressing apparatus 20 to the coils 12, 13. Additionally, as shown in FIG. 2, the first coil support platform 18 has an aperture through which the radial band 22 of the clamping apparatus 20 runs. Although not shown in the drawings, the second coil support platform 16 is similarly shaped with an aperture through which the radial band 22 runs.

FIGS. 1 and 2 also show the system 10 including filler layers 28 compressed between the radial band pins 24, 26 and the respective coil support platforms 16, 18. By resting against the platforms, 16, 18 the filler layers form a layer for transmitting the force from the clamping apparatus 20 to the coils 12,13. Preferably, the filler layer 28 is constructed of a fiberous material that is treated with epoxy. More specifically, the fiberous material may be a polyethylene terephthalate fibre. Additionally, the coil support platforms 16, 18 preferably comprise a fiberglass material impregnated with an epoxy resin. The epoxy resin of the respective platforms 16, 18, and the filler layer 28, in addition to the force of the band 22, holds the filler layers 28 in place.

As shown in FIG. 2, the system 10 also includes a preload apparatus 32 arranged between each end 50, 52 of the first radial band pin 24 and the first coil support platform 18. Thus, in the preferred embodiment there are two preload apparatuses 32. FIG. 1 illustrates a preload apparatus 32 under an end of the first radial band pin 24. FIG. 2 depicts two preload apparatuses 32 between the first radial band pin 24 and the first coil 12. Installation of the preload apparatuses 32 may occur after the band 22 is cured as described above and prior to placing the band 22 under tension with the jack.

As shown in FIGS. 1 and 2, each preload apparatus 32 includes one or more springs 48 and a pin block 30 compressed between an end 50, 52 of the first radial band pin 24 and the first coil 12. In this preferred embodiment, the springs 48 are conical in shape. Preferably, the springs are Belleville® type fiberglass spring washers. As shown in the preferred embodiment, two springs 48 are used in each preload apparatus 32. However, since the force exerted by the springs 48 will vary in relation to the number of springs 48 employed, the number of springs 48 used in the system can be changed to provide the requisite force. Alternatively, as will be appreciated by those skilled in the art, the force exerted by the springs 48 can be varied by changing the orientation of the springs 48 relative to each other.

The pin blocks 30 are preferably constructed of fiberglass impregnated with an epoxy resin. As shown in FIG. 2, the pin blocks 30 are in contact with slots in the underside of the first band pin 24. Because the first radial band pin 24 is also constructed of a fiberglass material impregnated with an epoxy resin, the pin blocks 30 and the radial band pin 24 are held together at least in part by the epoxy resin.

Additionally, as shown in FIG. 2 the preload apparatus 32 may also include a pin 36 extending from a cavity 38 of the pin block 30 through the springs 48 and into a recess 40 in the first coil support platform 18. Cement or a similar method may be used to attach the pin 36 to the cavity 38 of the pin block 32. By orienting the pin 36 in this manner, the pin 36 retains the springs 48 and acts to prevent or minimize their movement.

As described above in the preload system disclosed in U.S. Pat. No. 4,563,607 the springs of that preload apparatus run circumferentially around the radial band and can touch the radial band 22. Additionally, in the preload system described in that patent the springs have apertures through which the radial band extends. In operation, the springs can be weakened as the tensioned band 22 contacts the springs. In contrast, as is clearly shown in FIG. 2, the preload apparatuses 32 in this invention do not run circumferentially around the radial band 22 and do not touch the radial band 22. Rather, the preload apparatuses 32 are arranged between the first radial band pin 24 and the first coil support platform 18. Significantly, the springs 48 may have apertures, but the radial band 22 does not run through them. In contrast, apertures in the springs 48 in this invention may be used merely for a retainer pin 36. Thus, since the band 22 does not run circumferentially around the springs 48, the highly pressurized radial band 22 will not weaken the compressible springs 48 in this invention.

As mentioned above, in this embodiment the radial band 22 is clamped through the end winding coils 12, 13, and a preload apparatus 32 is compressed under each end 50, 52 of the first radial band pin 24. When clamped the coils 12, 13 are placed under pressure, and the vibration of the coils 12,13 is minimized. During operations of the stator 14 the band 22 tends to relax due to insulation creep and the pressure exerted by the band 22 on the coils 12, 13 also relaxes. This increases the vibration of the coils 12,13. With the preload system 10 employed, the preload apparatuses 32 act to either prevent or lower the rate at which the pressure is relaxed on the coils 12, 13 when the radial band 22 loosens. More specifically, as the pressure exerted by the band 22 decreases, the compressed spring 48 pushes outward against the radial band pin 24 and toward the coils 12,13. As the spring 48 pushes, a force is placed on the coils 12, 13, and the vibration of the coils 12, 13 is minimized.

As shown in FIG. 1, the system 10 may further comprise a shim block 56 and a set of tapered shims 58 having tapered ends arranged between the second radial band pin 26 and the second coil 13. The tapered shims 58 are oriented such that the tapered ends oppose each other. Preferably, the shims 56 and the tapered shims 58 are constructed of a fiberglass material impregnated with an epoxy resin. The shims 56 and the tapered shims 58 act to support the second coil 13 and transmit the force from the clamp 20 to the second coil 13.

Although in the preferred embodiment of this invention the preload apparatuses 32 are arranged below the first coil 12, they could alternatively be arranged above the second coil 13 and below the second radial band pin 26. In this alternative embodiment, FIG. 2 would be identical with the exception that the second coil 13, the second radial band pin 26 and the second coil support platform 16 would be shown in the drawing rather than the first coil 12, the first radial band pin 24, and the first coil support platform 18 respectfully.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A preload system for preloading a first coil end winding and a second coil end winding of a stator, comprising:

a first coil support platform coupled to a periphery of the first coil;

a clamping apparatus compressing the end winding coils and the first coil support platform; and a first preload apparatus between the clamping apparatus and the first coil support platform and not running circumferentially around the clamping apparatus;

wherein the first preload apparatus comprises a pin block and a spring compressed between the clamping apparatus and the first coil support platform.

2. The system as described in claim 1, wherein the first preload apparatus further comprises a retainer pin extending from a cavity of the pin block into a recess of the first coil support platform.

3. The system as described in claim 1, wherein the spring has a conical shape.

4. The system as described in claim 1, wherein the clamping apparatus further comprises a radial band and a radial band pin.

5. A preload system for preloading a first coil end winding and a second coil end winding of a stator, comprising:

a first coil support platform coupled to a periphery of the first coil;

a clamping apparatus compressing the end winding coils and the first coil support platform;

a first preload apparatus between the clamping apparatus and the first coil support platform and not running circumferentially around the clamping apparatus; and a second preload apparatus between the clamping apparatus and the first coil support platform, the second preload apparatus not running circumferentially around the clamping apparatus.

6. The system as described in claim 5, wherein the first preload apparatus and the second preload apparatus each further comprise a spring and a pin block.

7. The system as described in claim 6, wherein the first preload apparatus and the second preload apparatus each further comprise a retainer pin extending from a cavity of the respective pin blocks and into recesses of the first coil support platform.

8. The system as described in claim 7, wherein the springs have a conical shape.

9. A preload system for preloading a first coil end winding and a second coil end winding of a stator, comprising:

a first coil support platform coupled to a periphery of the first coil;

a clamping apparatus compressing the end winding coils and the first coil support platform;

a first preload apparatus between the clamping apparatus and the first coil support platform and not running circumferentially around the clamping apparatus; and a second coil support platform coupled to a periphery of the second coil, the clamping apparatus compressing the second coil support platform.

10. A preload system for preloading a first coil end winding and a second coil end winding of a stator, comprising:

a first coil support platform coupled to a periphery of the first coil;

a clamping apparatus compressing the end windings coils and the first coil support platform, the clamping apparatus having a band and a first band pin;

a first preload apparatus between a first end of the first band pin and the first coil support platform and not running circumferentially around the band; and a second preload apparatus between a second end of the first band pin and the first coil support platform and not running circumferentially around the band.

11. The system as described in claim 10, wherein the first and the second preload apparatuses each further comprise a pin block and a spring.

12. The system as described in claim 11, wherein the springs are conical in shape.

13. The system as described in claim 11, wherein the first preload apparatus and the second preload apparatus each further comprise a retainer pin extending from a cavity of the respective pin blocks and into recesses of the first coil support platform.

14. The system as described in claim 10, further comprising a filler layer arranged between the first coil support platform and the first coil.

15. A preload system for preloading a first coil end winding and a second coil end winding of a stator, comprising:

a first coil support platform coupled to a periphery of the first coil and a second coil support platform coupled to a periphery of the second coil;

a filler layer between the first coil support platform and the first coil;

a radial band clamp compressing the end windings coils and the coil support platforms, and having a radial band, a first radial band pin and a second radial band pin, the first radial band pin having a first end and a second end;

a first preload apparatus that does not touch the radial band and is arranged between the first end of the first radial band pin and the first coil support platform; and a second preload apparatus that does not touch the radial band and is arranged between the second end of the first radial band pin and the first coil support platform.

16. The system as described in claim 15, wherein the first and the second preload apparatuses each further comprise a pin block and a spring.

17. The system as described in claim 16, wherein the first preload apparatus and the second preload apparatus each further comprise a retainer pin extending from a cavity of the respective pin blocks and into recesses of the first coil support platform.

18. The system as described in claim 15, wherein the springs are conical in shape.

* * * * *